(12) United States Patent
Wilson

(10) Patent No.: US 6,526,381 B1
(45) Date of Patent: Feb. 25, 2003

(54) REMOTE CONTROL WITH SPEECH RECOGNITION

(75) Inventor: Andrew T. Wilson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/409,119

(22) Filed: Sep. 30, 1999

(51) Int. Cl.⁷ .............................................. G10L 15/04
(52) U.S. Cl. ...................... 704/251; 704/275; 704/243; 704/256; 455/422; 455/563; 379/88.01
(58) Field of Search ................................. 704/275, 251, 704/256, 270–274, 231, 240, 252, 243, 241, 244; 455/422, 563; 434/185, 118, 156; 379/88.01, 88.02, 88.03

(56) References Cited

U.S. PATENT DOCUMENTS

| | | | | |
|---|---|---|---|---|
| 5,615,296 A | * | 3/1997 | Stanford et al. ............. | 704/222 |
| 5,774,859 A | * | 6/1998 | Houser et al. ............... | 704/275 |
| 5,818,423 A | * | 10/1998 | Pugliese et al. ............. | 345/157 |
| 5,822,405 A | * | 10/1998 | Astarabadi ................... | 379/352 |
| 5,950,167 A | * | 9/1999 | Yaker .......................... | 704/270 |
| 6,075,575 A | * | 6/2000 | Schein et al. ................ | 345/684 |
| 6,085,080 A | * | 7/2000 | Rahikainen et al. ......... | 455/403 |
| 6,173,259 B1 | * | 1/2001 | Bijl et al. .................... | 704/235 |
| 6,188,985 B1 | * | 2/2001 | Thrift et al. ................. | 348/734 |
| 6,233,556 B1 | * | 5/2001 | Teunen et al. .............. | 704/250 |
| 6,252,544 B1 | * | 6/2001 | Hoffberg ............... | 342/357.06 |

* cited by examiner

*Primary Examiner*—Vijay Chawan
(74) *Attorney, Agent, or Firm*—Trop, Pruner & Hu, P.C.

(57) ABSTRACT

A processor-based system may utilize a remote control unit which not only allows mouse input commands to be provided to the processor-based system but also includes a microphone and a speech engine for decoding spoken commands and providing code for presenting the commands to the processor-based unit. The processor-based system may provide information to the remote control unit about the vocabulary currently being used by applications active on the processor-based system. This allows the speech engine in the remote control unit to focus on a more limited vocabulary, increasing the accuracy of the speech recognition function and decreasing the capabilities necessary in the remote control unit based speech engine.

28 Claims, 6 Drawing Sheets

REMOTE CONTROL WITH SPEECH RECOGNITION

Background

This invention relates generally to speech recognition and particularly to the control of computer software using spoken commands.

Currently available speech recognition software recognizes discrete spoken words or phonemes contained within words in order to identify spoken commands. The processing of the spoken commands is usually accomplished using what is known as a speech engine. Regardless of whether discrete terms or phonemes are utilized, the speech engine is called by the application program which needs the speech recognition service.

Operating systems may include Application Program Interface (API) software utilities which provide speech recognition. An application may incorporate a call to the speech API or the speech recognition may be supplied externally by a second application that intercepts the speech and feeds the first application simulated keys or commands based on the speech input information.

Speech recognition technology has been applied to controlling processor-based systems including desktop computer systems. A variety of different speech recognition software is available, some of which comes with a microphone which may be worn by the user. Apparently, the idea is that extraneous sounds around the system, such as the system cooling fan may disrupt the speech recognition quality. The microphone feeds into a sound port, usually on the back of the processor-based system. The use of the microphone allows the speech recognition engine to process the sounds less influenced by surrounding noise.

However, there is a continuing need for better ways to implement speech recognition services for processor-based systems.

SUMMARY

In accordance with one aspect, a processor-based system includes a first processor-based device having an airwave communication transceiver. A remote control unit has an airwave communication transceiver to communicate with the first processor-based device. The remote control unit includes a speech engine and a microphone coupled to the speech engine.

Other aspects are set forth in the accompanying detailed description and claims.

DETAILED DESCRIPTION

Figure 1:
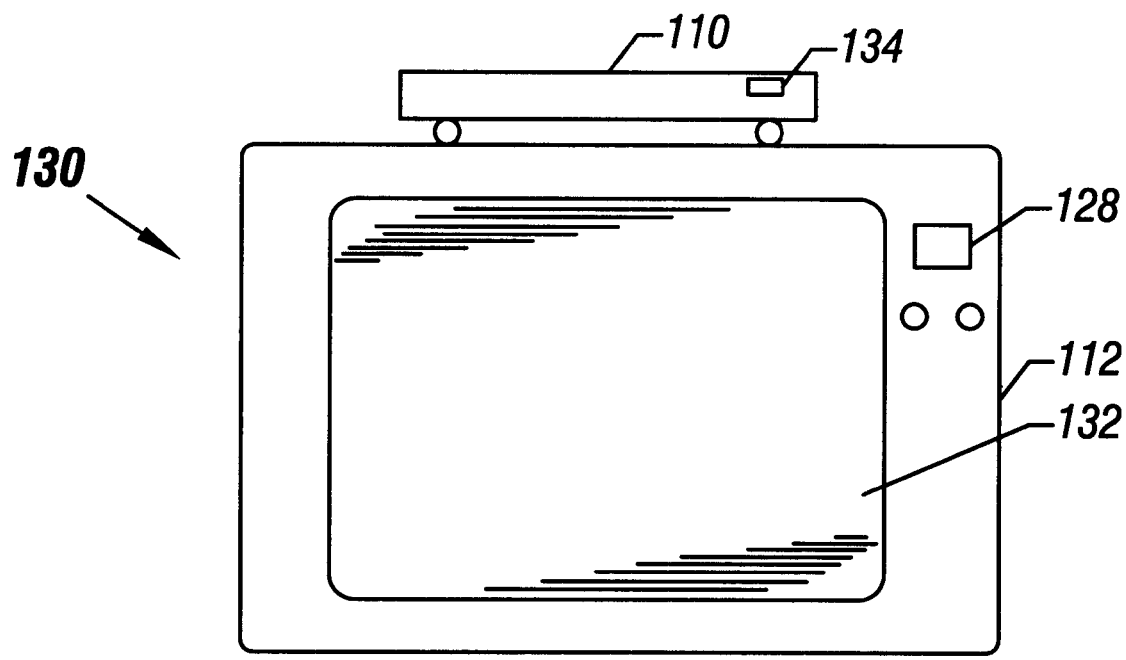
FIG. 1 is a front elevational view of a remotely controlled processor-based system.
Figure 1:
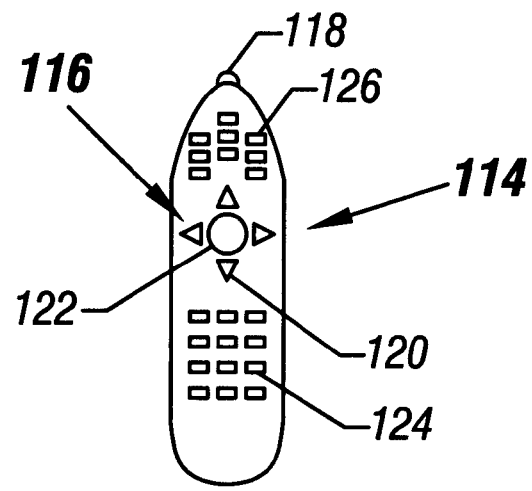

Referring to FIG. 1, a processor-based system 130, illustrated as a set top computer system, includes a processor-based unit 110 which sits atop a television receiver 112. The television receiver and the processor-based unit 110 may be controlled by a remote control unit 114. The remote control unit may communicate through its own transceiver 118 with a transceiver 134 on the processor-based unit 110 and a transceiver 128 on the television receiver 112. The communications between the remote control 114 unit and the television receiver/processor-based unit may use any of a variety of airwave communications including infrared, ultrasonic or radiowave signaling.

While the present invention has been illustrated in connection with a set top computer system, those skilled in the art will appreciate that the present application is also applicable to any of a variety of other processor-based systems including desktop computers, laptop computers and a variety of other processor-based appliances.

The remote control unit (RCU) 114 includes a microphone 126. It also includes a cursor control system 116 which operates essentially like a mouse. The RCU 114 includes a mouse button 122 and a plurality of cursor direction control buttons 120. Thus, the position of a cursor or highlighting on a screen 132 may be controlled by operating one of the four directional control buttons 120. When the desired icon is indicated on the screen 132, it may be selected by operating the button 122. The remote control unit 114 may also include a numerical keypad 124.

Figure 2:
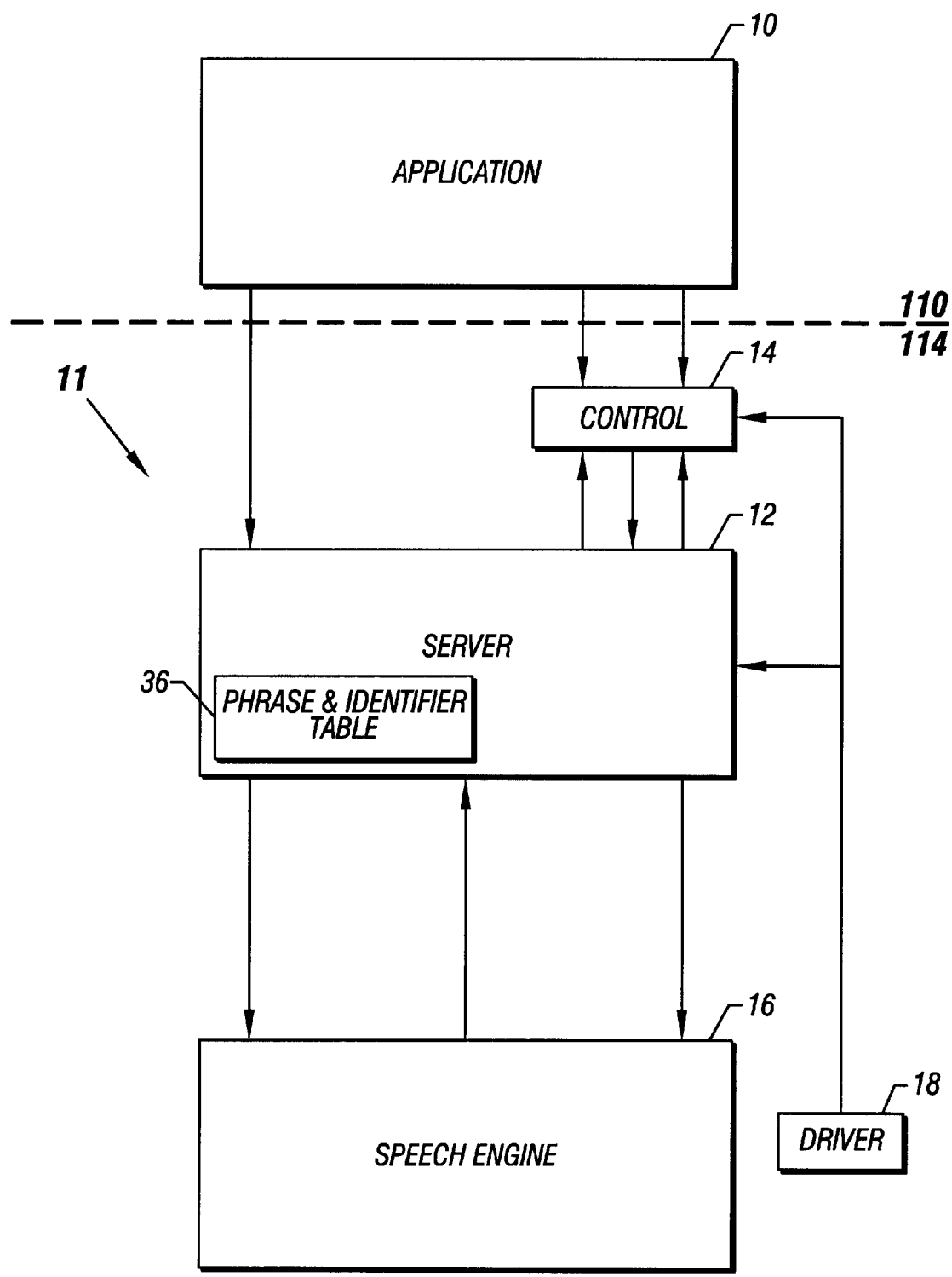
FIG. 2 is a block diagram of a speech recognition system.

Referring to FIG. 2, a speech recognition system 11, operating on the RCU 114, works with an application software program 10, running on the processor-based unit 110 which needs to respond to spoken commands. For example, the application 10 may be implemented through various graphical user interfaces or windows in association with the Windows® operating system. Those windows may call for user selection of various tasks or control inputs. The application 10 may respond either to spoken commands or tactile input commands. Tactile input commands may include pushing a keyboard key, touching a display screen, or mouse clicking on a visual interface, using the RCU 114.

The application 10 communicates with a server 12. In an object oriented programming language, the server 12 could be a container. In the illustrated embodiment, the server 12 communicates with the control 14 which could be an object or an ActiveX control, for example. The control 14 also communicates directly with the application 10.

The server 12 can call the speech recognition engine 16. At the same time, a driver 18 can provide input signals to the server 12 and the control 14. Thus, in some embodiments, the control 14 can receive either spoken or tactile inputs (from the driver 18) and acts in response to each type of input command in essentially the same way.

Figure 3:
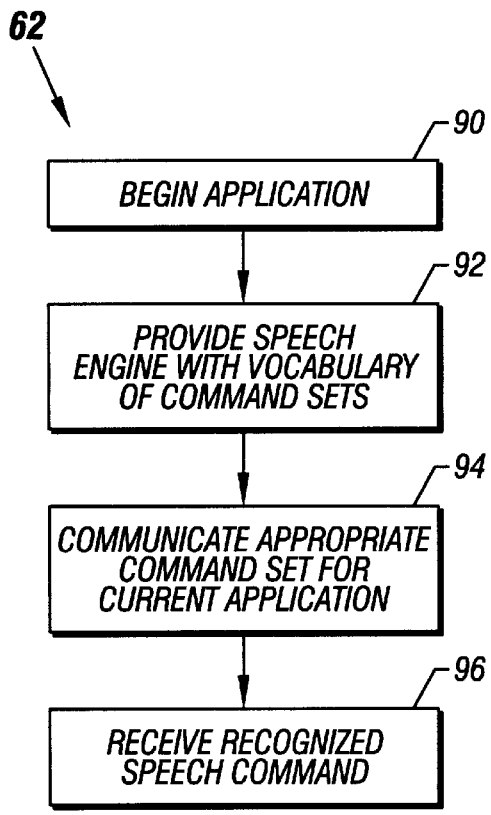
FIGS. 3-5 are flow diagrams for the speech recognition system shown in FIG. 1.

Referring to FIG. 3, a program for recognizing speech may involve beginning an application (block 90) on the processor-based unit 110 that needs speech recognition services. The speech engine is provided with a vocabulary of command sets for an active screen or task, as indicated in block 92. The command sets could be the vocabulary for each of the various applications that are implemented by the particular computer system or by a particular application program. The command set for the current application that is currently running is communicated to the server 12 or control 14 (block 94). Next, the speech is recognized and appropriate actions are taken, as indicated in block 96.

Figure 4:
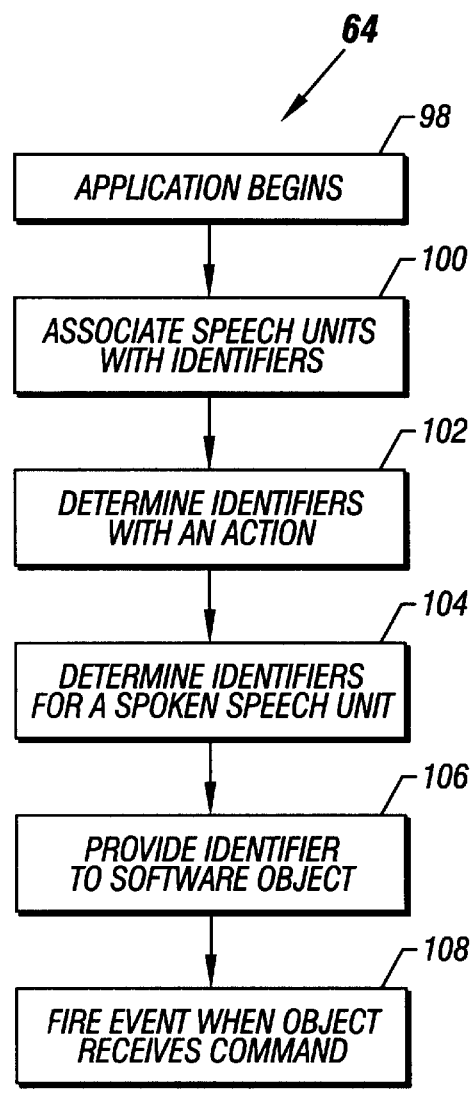

Another implementation, shown in FIG. 4, also begins with starting an application, as indicated in block 98. Speech units that need to be decoded are associated with identifiers (block 100). The identifiers may then be associated with a particular action to be taken in the application in response to the spoken command (block 102). Next, the flow determines the identifier for a particular spoken speech unit (block 104). The identifier is provided to a software object such as the control 14, as indicated in block 106. An event is fired when the object receives the command, as shown in block 108. The event may be fired by the object whether the command is a result of a spoken command or a tactilely generated command.

Figure 5:
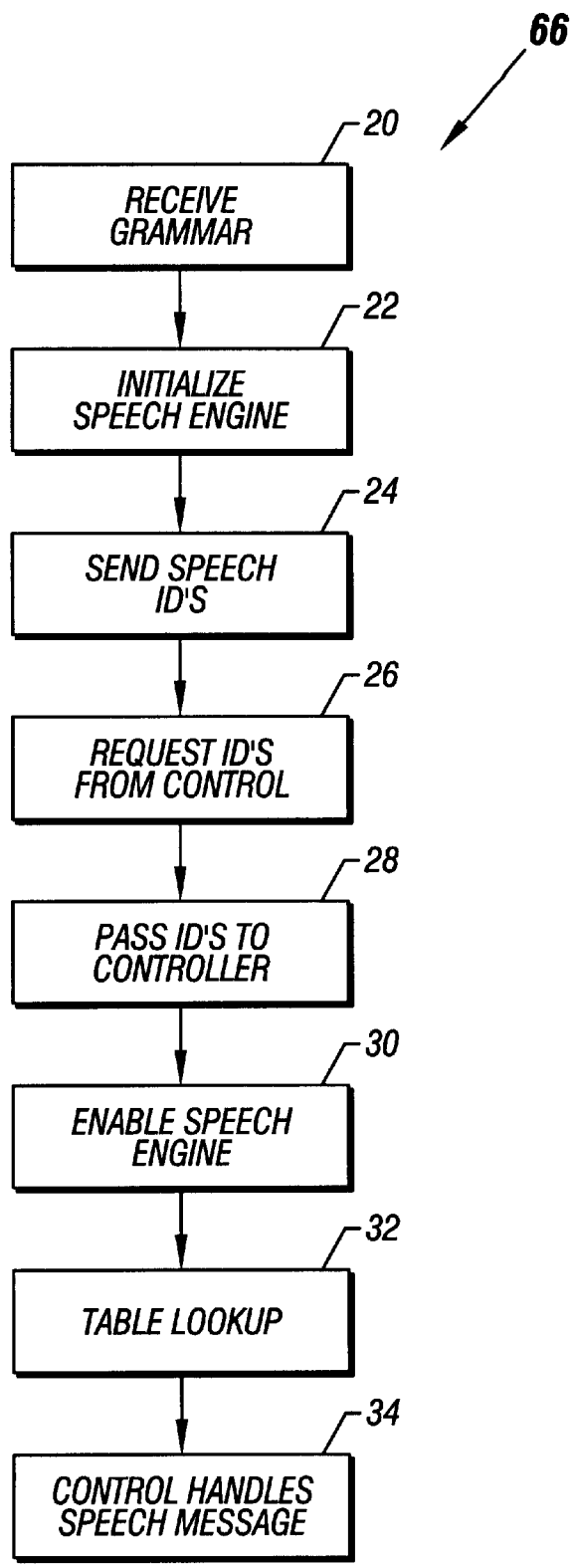

Referring to FIG. 5, the application 10 passes a grammar table to the server 12 (block 20). In particular, the application initializes the grammar with speech identifiers associated. with each spoken command used in the application. These commands make up all of the command sets for a given engine. The grammar is a set of commands that may include alternative phrases. For example, a simple grammar could be (start/begin)(game X). This grammar would respond to the spoken commands "start game X" and "begin game X".

The speech recognition engine 16 can operate on phonemes or with discrete terms. Thus, the application provides the particular command set (which is a subset of the engine's available commands) with the active application. This facilitates speech recognition because the speech recognition engine can be advised of the particular words (command set) that are likely to be used in the particular application that is running. Thus, the speech recognition engine only needs to match the spoken words with a smaller sub-vocabulary. For example, if the game x function was operating, only the command set of words associated with that application need be decoded.

In response, the server 12 initializes the speech engine 16 (block 22). The server 12 has a phrase and identifier table 36 as indicated in FIG. 2. The application 10 also sends the speech identifiers associated with given spoken commands to the control 14 or server 12 (block 24). When the control 14 is activated in the container or server, the control may call the onControlInfoahanged method in the IOleControlSite interface, in an embodiment using ActiveX controls. This provides for transfer of information from the control 14 to the server 12 (block 26). The server in turn may call the GetControlInfo method from the IoleControl interface which allows communications from the server or container 12 to the control 14 (block 28).

The server uses the GetControlInfo method in the IOleControl interface and the OnMnemonic method in IOleControl to request identifiers from the control. The control may provide this information through IOleControlSite interface and the OnControlInfoChanged method, using ActiveX technology for example.

The server 12 enables the speech engine 16 (block 30), for any commands that are active, from the server's table 36. The server uses the table 36 from the application to provide focus in particular applications. The control provides an effect comparable to that of an accelerator key. Namely, it provides a function that can be invoked from any window or frame reference. The application provides the speech identifiers and associates the identifiers with an actionby the control.

The server knows which vocabulary to use based on what task is running currently. In a system using windows this would correspond to the active screen. Thus, if the navigator is running, the server knows what the sub-vocabulary is that must be recognized by the speech engine.

When the server receives a speech message, it calls the speech API in the engine 16. When a phrase is detected, the engine provides the phrase to the server for example, as a text message. The container does a table look-up (block 32). On a match between the phrase and the identifier, the server 12 may call the OnMnemonic method of the IOleControl interface, passing the identifier to the control. The control follows its preprogrammed rules and implements the corresponding action (block 34). The control may handle the message internally or send an event to the server.

As a simple example, a given screen may include two buttons, "ok" and "delete". When the application comes up it sends the grammar for this screen to the server. For example, the grammar for "ok" might include "ok", "right" and "correct".

The application then associates "ok" with an identifier which corresponds to a particular control and does the same thing with "delete". The identifier is simply a pointer or handle that is unique, within the application, to the particular command. The table 36 then includes the phrases "ok" and "delete", an identifier for each phrase and an identifier for the control that handles the command.

When a control is instantiated, the application provides it with its identifier. The control is preprogrammed with the action it will take when the server advises the control that its identifier has been called.

When a speaker uses a word, the speech engine sends the word to the server. The server checks the phrases in its table 36 to see if the word is in its active list. In the simple example, if the word sent by the speech engine is not "ok" or "delete," it is discarded. This would indicate a speech engine error. If there is a match between the word and the active vocabulary, the server sends the appropriate control identifier to the appropriate control, which then acts according to its programmed instructions.

A phoneme based speech engine with a large vocabulary can be used with high reliability because the engine is focused on a limited vocabulary at any given time. Advantageously this limited vocabulary may be less than 20 words in the table 36 at any given instance.

This frees the application from having to keep track of the active vocabulary. The application can tell the server which words to watch for at a given instance based on the active task's vocabulary.

There may also be a global vocabulary that is always available regardless of the active screen. For example, there may be a "Jump" command to switch screens or an "Off" command to terminate the active task.

Advantageously, the existing mnemonics or "hot keys" available in Microsoft Windows® may be used to implement speech recognition. For example, the OnMnemonic method may be given the new function of passing information from the server to the control corresponding to a spoken command.

While the methodology is described in connection with an ActiveX control, other object oriented programming technologies may be used as well including, for example, Javabeans and COM. In addition, still other such techniques may be developed in the future.

Figure 6:
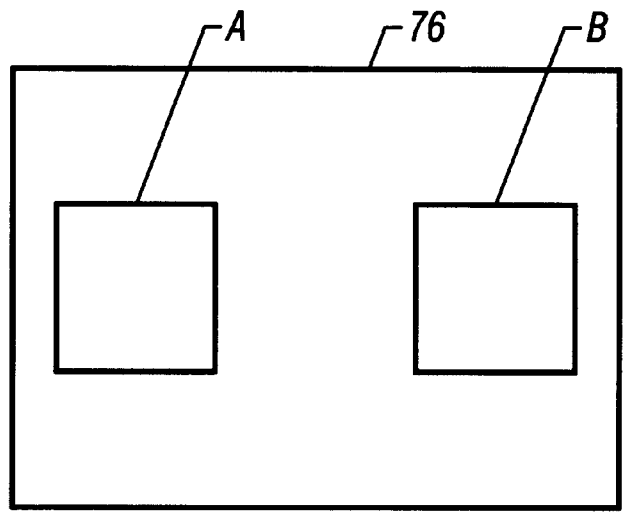
FIG. 6 is a schematic view of a computer display with two active windows.
Figure 7:
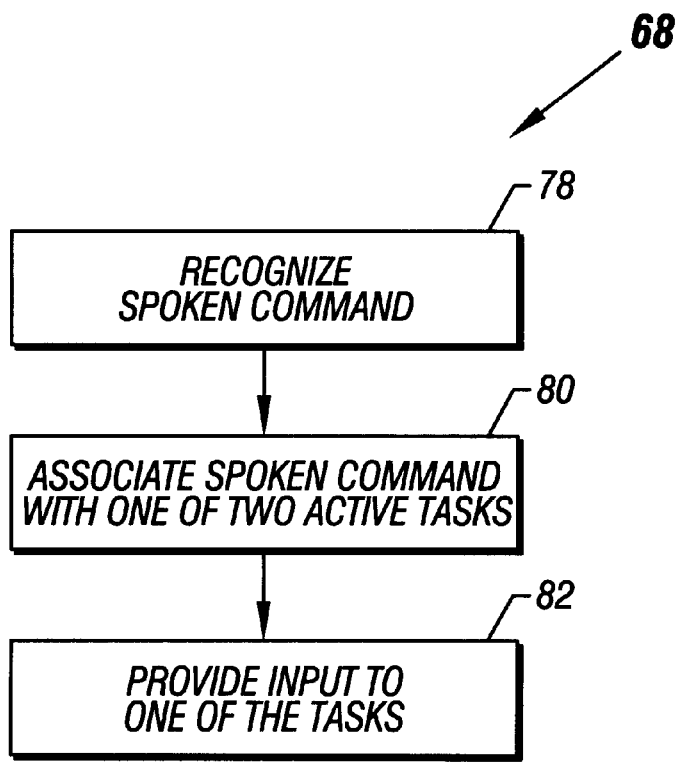
FIG. 7 is a flow diagram of a program in accordance with one embodiment.

With embodiments of the present invention, an effect comparable to that of an accelerator key is provided. It gives a focus to the command with reference to a particular application. Therefore, speech can be used to focus between two operating tasks. For example, as shown in FIG. 6, if two windows A and B are open at the same time on the screen 76, the command that is spoken can be recognized as being associated with one of the two active task windows or frames. Referring to FIG. 7, after a command is recognized (block 78), the application provides information about what is the primary, currently operating task and the speech may be associated with that particular task to provide focus (block 80). An input is then provided to one of the tasks (and not the other), as indicated at block 82. The speech recognition is accomplished in a way which is effectively invisible to the application. To the application, it seems as though the operating system is effectively doing the speech recognition function. The synchronization is reduced.

The message which is passed to the ActiveX control from the container can include a field which allows the application to know if the command was speech generated. This may be useful, for example, when it is desired to given a spoken response to a spoken command. Otherwise, the application is basically oblivious to whether or not the command was speech generated or tactilely generated.

While the application loads the identifiers into the ActiveX controls (when they are instantiated), the controls and the container handle all of the speech recognition for the command words. The control and its container are responsible for managing when the words are valid and for sending appropriate messages to the application. Thus, the container or server does all the communication with the speech recognition API. The container may communicate with the ActiveX controls by standard interfaces such as IOleControl. As a result, the number of state errors that would otherwise occur if the application were forced to handle the speech recognition itself.

Figure 8:
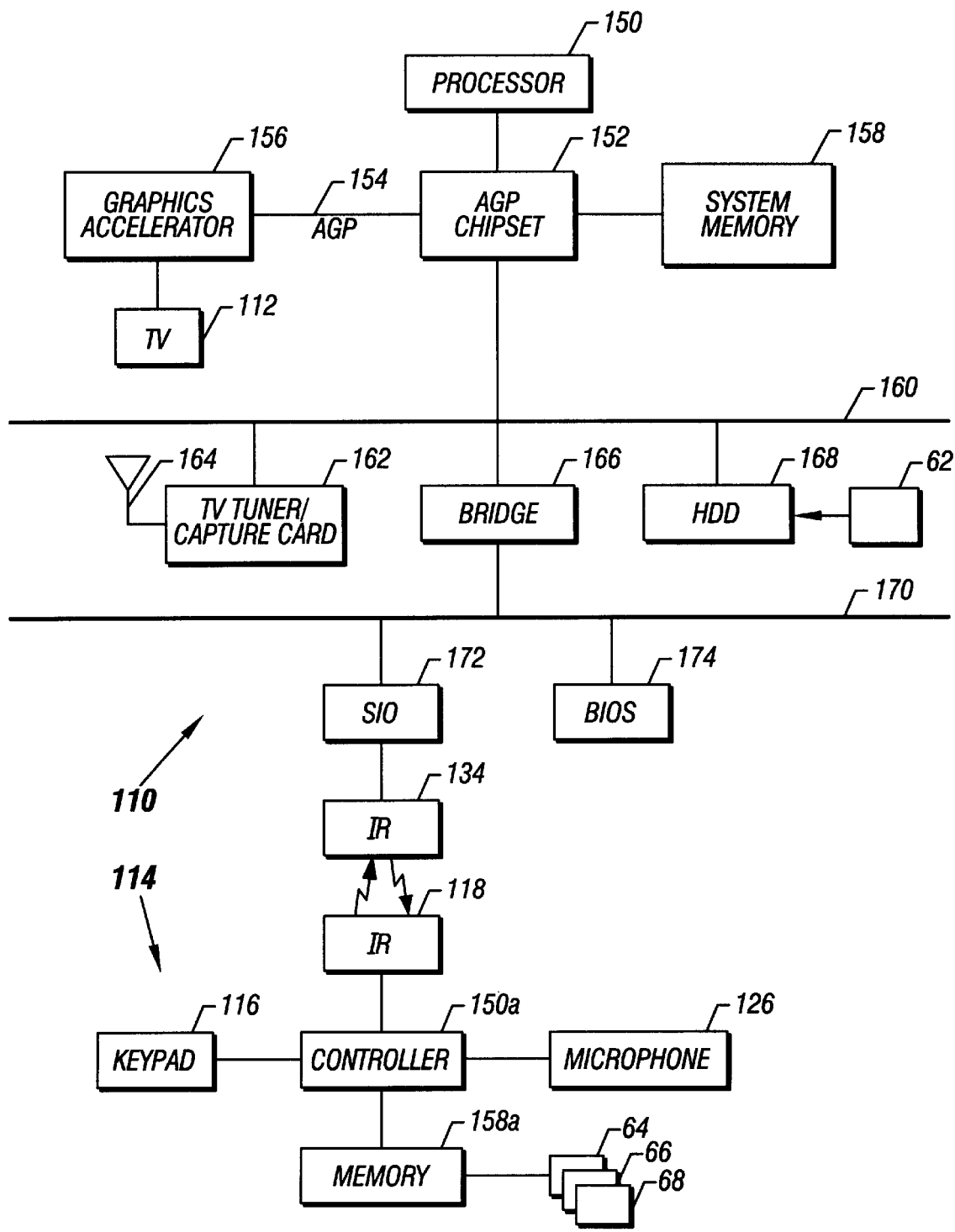
FIG. 8 is a block diagram of a hardware system for use with the speech recognition system.

Referring next to FIG. 8, a hardware implementation for the embodiment shown in FIG. 1 includes a processor 150. In one embodiment, the processor may be coupled to an accelerated graphics port (AGP) (see Accelerated Graphics Port Interface Specification, Rev. 1.0, published Jul. 31, 1996 by Intel Corporation, Santa Clara, Calif.) chipset 152 for implementing an accelerated graphics port embodiment. The chipset 152 communicates with the AGP port 154 and the graphics accelerator 156. The television 112 may be coupled to the video output of the graphics accelerator 156. The chipset 152 accommodates the system memory 158.

The chipset 152 is also coupled to a bus 160. The bus 160 couples a television tuner/capture card 162 which is coupled to an antenna 164 or other video input port, such as a cable input port, a satellite receiver/antenna or the like. The television tuner/capture card selects a desired television channel and also performs a video capture function. One exemplary video capture card is the ISVR-III Video Capture Card available from Intel Corporation.

The bus 160 is also coupled to a bridge 166 which may couple a storage device such as a hard disk drive 168 or a flash memory. The drive 168 may store the software 62 (FIG. 3). The bridge 166 is also coupled to another bus 170. The bus 170 may in turn be coupled to a serial input/output (SIO) device 172. The device 172 is coupled to an infrared interface 134. Also connected to the bus 170 is a basic input/output system (BIOS) 174.

The IR interface 134 may communicate using infrared signals with an IR interface 118 on the RCU 114. Any of a variety of protocols may be utilized for implementing IR communications. In addition, other forms of airwave communications may be utilized as well.

The IR interface 118 on the RCU 114 communicates with a controller 150a which may be a processor such as a digital signal processor. The controller 150a communicates with the keypad 116 on the RCU 114 and the memory 158a. The controller 150a also receives spoken commands through the microphone 126. The memory 158a may conveniently be implemented by a flash memory. The memory 158a stores the software 64 (FIG. 4), 66 (FIG. 5) and 68 (FIG. 7) for implementing the speech recognition features.

There are a number of advantages inherent in using the RCU 114 to implement speech recognition functions. First of all, by placing the microphone 126 in the RCU 114, the speech capture may be achieved closer to the speech source. This may remove sources of ambient noise including those associated with the cooling fan or the processor-based unit 110.

Moreover, by having speech recognition functions in the RCU 114, the bandwidth of the communication path between the RCU 114 and the processor-based unit 110 may be diminished. Namely, by enabling an application running on the processor-based unit 110 to communicate information which allows a limited set of information to be utilized in the RCU 114, the RCU may recognize the speech and provide a relatively limited bandwidth consuming input command over the infrared link to the processor-based unit 110. Since the processor-based unit 110 can convey information to the RCU 114 about what command set to expect, a relatively small vocabulary speech engine may be implemented in the RCU 114 without requiring substantial processor capabilities.

For example, since the RCU 114 is battery-based, it is desirable to minimize the power usage in the RCU 114. By implementing the system described above, for example using flash memory on the RCU 114, a low power implementation may be operated.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor-based system comprising:
   a first processor-based device having an airwave communication transceiver;
   a remote control unit having an airwave communication transceiver to communicate with said first processor-based device, said remote control unit including a speech engine and a microphone coupled to said speech engine; and
   wherein said first processor-based device includes software to provide information to the remote control unit about an application which is currently running and the vocabulary used by the application, and said speech engine being programmed to utilize a spoken command and provide code corresponding to said spoken command through said remote control unit transceiver to said first processor-based device.

2. The system of claim 1 wherein said system is a set top computer.

3. The system of claim 1 wherein said first processor-based device includes an interface to provide information about the currently active application running on said first processor-based device to said remote control unit.

4. The system of claim 3 wherein said first processor-based device includes software to provide a vocabulary set to the speech engine in the remote control unit.

5. The system of claim 1 wherein said communication links are infrared based.

6. The system of claim 1 including a driver that can receive tactile or spoken commands that are recognized by the remote control unit.

7. The system of claim 1 wherein said remote control unit is battery-powered.

8. The system of claim 1 wherein said remote control unit transmits code over said transceiver to said first processor-based device corresponding to spoken commands received at said remote control unit through said microphone.

9. A remote control unit comprising:

a processor implementimg a speech engine;

a microphone coupled to said processor;

an airwave transceiver to communicate with a remote device; and wherein said speech engine is configured to operate on a limited vocabulary using information supplied from the remote device, indicative of the expected spoken command.

10. The remote control unit of claim 9 further including a set of mouse controls.

11. The remote control unit of claim 9 wherein said transceiver is an infrared transceiver.

12. The remote control unit of claim 9 wherein said processor includes software to send commands to the remote device when a spoken command is recognized by said speech engine.

13. A method comprising:

identifying an application currently active on a first processor-based device;

conveying information about the commands associated with said application to a second processor-based device;

receiving spoken commands at said second processor-based device using information from said first processor-based device to recognize said command; and transmitting information from said second processor-based device to said first processor-based device based on the recognition of said spoken command.

14. The method of claim 13 further including communicating between said devices using an airwave communication technique.

15. The method of claim 14 further including sending signals between said first and second processor-based devices using infrared signals.

16. The method of claim 13 further including responding to both spoken and tactilely generated input commands.

17. The method of claim 13 wherein receiving spoken commands at said second processor-based device includes receiving said commands through a microphone in said second processor-based device.

18. The method of claim 13 including operating said second processor-based device using battery power.

19. The method of claim 13 further including transmitting mouse command input signals from said second processor-based device to said first processor-based device.

20. The method of claim 13 including receiving said spoken commands through a remote control unit.

21. An article comprising a medium for storing instructions that cause a processor-based system to:

receive a spoken command;

use a vocabulary received from a remote device to recognize the spoken command; and transmit information to said remote device based on the recognition of said spoken command.

22. The article of claim 21 further storing instructions that cause a processor-based system to recognize mouse input commands and to transmit information about said input commands to a remote device.

23. The article of claim 21 further storing instructions that cause a processor-based system to receive a vocabulary related to an application receiving on said remote device.

24. An article comprising a medium for storing instructions that cause a processor-based system to:

identify an application currently active on said processor-based system;

convey information about the commands associated with said application to a remote processor-based device; and receive information from said remote processor-based device based on the recognition of said spoken command.

25. The article of claim 24 further storing instructions that cause a processor-based system to communicate with said remote device using an airwave communication technique.

26. The article of claim 24 further storing instructions that cause a processor-based system to respond to both spoken and tactilely generated input commands.

27. The article of claim 24 further storing instructions that cause a processor-based system to receive mouse command input signals from the remote processor-based device.

28. The article of claim 24 further storing instructions that cause a processor-based system to transmit a portion of a total vocabulary to the remote device based on the currently active application on said processor-based system.

* * * * *